No. 672,164. Patented Apr. 16, 1901.
C. CALLAHAN.
HOSE PIPE OR NOZZLE.
(Application filed Dec. 6, 1900.)
(No Model.)
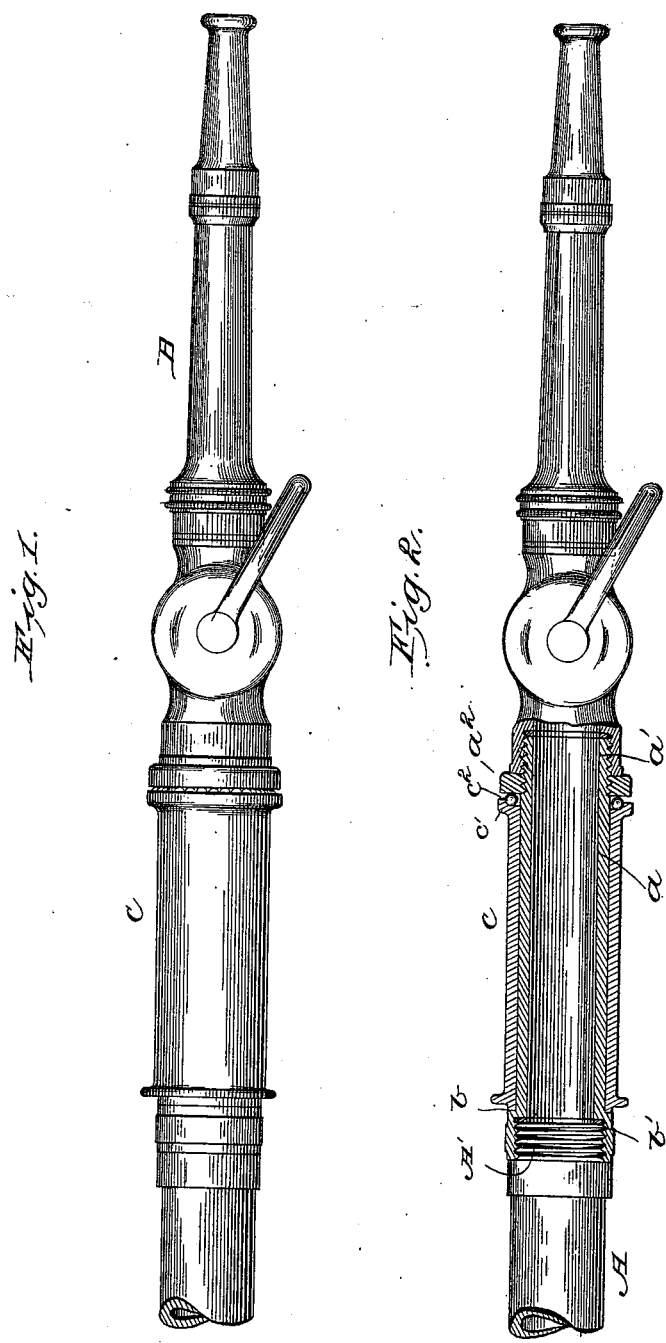
Witnesses.
W. C. Lunsford.
Thomas J. Drummond.
Inventor
Cornelius Callahan.
by Dursley Gregory
attys.

UNITED STATES PATENT OFFICE.

CORNELIUS CALLAHAN, OF CANTON, MASSACHUSETTS.

HOSE PIPE OR NOZZLE.

SPECIFICATION forming part of Letters Patent No. 672,164, dated April 16, 1901.

Application filed December 6, 1900. Serial No. 38,865. (No model.)

*To all whom it may concern:*

Be it known that I, CORNELIUS CALLAHAN, a citizen of the United States, residing at Canton, county of Norfolk, State of Massachusetts, have invented an Improvement in Hose Pipes or Nozzles, of which the following description, in connection with the accompanying drawings, is a specification, like letters on the drawings representing like parts.

When a pipe or nozzle is screwed upon an external thread connected with a length of hose, the hose in being put into use frequently becomes twisted, which interrupts the flow of water and makes the hose hard to handle, and in such condition it is customary to rotate the hose, and the pipeman has also to rotate the pipe in his hands.

The object of this invention is to provide a hose-pipe with a loose or swiveling handpiece in which the pipe may rotate freely as the hose is turned to take out from it any axial twist.

My invention consists, therefore, in a hose-pipe having a loose or swiveling handpiece adapted to be grasped in the hand by the pipeman.

Figure 1, in elevation, shows a hose pipe or nozzle containing my invention; Fig. 2, a like view with the handpiece in longitudinal section.

Referring to the drawings, A represents part of a length of hose, A' an externally-threaded coupling of usual kind applied thereto, and B represents part of a hose pipe or nozzle having a valve B' of usual construction. The inner end of the pipe is prolonged by a tubular extension $a$, having at one end an external thread $a'$, on which is screwed the internally-threaded end of the pipe. The opposite extremity of the extension is enlarged to form a shoulder $b$ and is threaded internally at $b'$ to engage the usual coupling A'. The extension is surrounded loosely by a swiveling sleeve $c$, one end of which is shown as coacting with the shoulder $b$, the opposite end of the sleeve, as shown, having a grooved flange $c'$ to receive a series of balls $c^2$ or other usual antifriction means. The balls or antifriction means also run or act against a ring $a^2$, shown as screwed upon the threaded end of the extension, the adjustment of said nut compensating for any wear on the sleeve or the antifriction means.

I believe that I am the first to provide a hose pipe or nozzle with a loose or swiveling handpiece adapted to be grasped by the pipeman, leaving the pipe and the hose free to be turned in the sleeve of the handpiece as necessity requires while the pipeman yet holds the pipe, so this invention is not limited to the exact shape or construction of the loose handpiece or to the exact method shown for retaining the sleeve loosely on or connected with the extension.

Having described my invention, what I claim, and desire to secure by Letters Patent, is—

1. A hose-pipe having a sleeve provided in the length thereof constituting a handpiece, said handpiece being loose or swiveled upon said pipe to permit turning of the pipe in said handpiece.

2. A hose-pipe handpiece composed of a tubular extension, and a surrounding sleeve applied loosely to said extension, said extension being adapted to be connected at one end with a length of hose and at its other end with a hose-pipe.

3. A hose-pipe provided with a tubular extension, a loose sleeve constituting a handpiece surrounding said extension and within which the pipe may turn, and means to restrain the extent of sliding movement of the sleeve on said extension.

4. A hose-pipe provided with a tubular extension, a loose sleeve constituting a handpiece and surrounding said extension, means to restrain the extent of sliding movement of the sleeve on said extension, and interposed antifriction means to enable said hose-pipe to rotate freely within said handpiece.

5. A hose-pipe extension having a shoulder, combined with a sleeve surrounding said extension loosely and constitute a handpiece within which the extension may turn, and a ring-nut adjustable on said extension to maintain the sleeve in operative position.

In testimony whereof I have signed my name to this specification in the presence of two subscribing witnesses.

CORNELIUS CALLAHAN.

Witnesses:
　GEO. W. GREGORY,
　EDITH M. STODDARD.